March 30, 1954 M. RETTINGER 2,673,896

MAGNETIC RECORD ERASING TRANSDUCER

Filed Dec. 29, 1951

INVENTOR.
MICHAEL RETTINGER
BY [signature]
ATTORNEY

Patented Mar. 30, 1954

2,673,896

UNITED STATES PATENT OFFICE 2,673,896

MAGNETIC RECORD ERASING TRANSDUCER

Michael Rettinger, Encino, Calif., assignor to Radio Corporation of America, a corporation of Delaware Application December 29, 1951, Serial No. 264,194

4 Claims. (Cl. 179—100.2)

This invention relates to magnetic sound systems and methods, and particularly to a system for erasing sound records on magnetic record mediums.

In my co-pending U. S. application, Ser. No. 182,316, filed August 30, 1950, I disclose a magnetic sound record erasing method and system which is particularly effective in erasing sound records from magnetic mediums. The basic principle involves passing the record to be erased through two magnetic fields separated from one another. This method of erasing magnetic sound records has been found to be particularly effective because of the nature and behavior of magnetic records.

The cascade connection of two erasing heads has been found to provide more complete erasing action than other forms of heads because of the "reawakening" or "memory" characteristic of a magnetic record. It has been found that, even after a magnetic sound record has been submitted to a single tremendous erasing action, which record appears completely eliminated shortly after the erasing current has been applied, the magnetism in the medium returns to some extent at a later time. It appears that there is a reorientation of the dipoles in the magnetic medium constituting the signal after the first application of the erasing current. However, by a second application after the dipoles have reoriented themselves, it has been found to completely obliterate the signal. In my co-pending application mentioned above, a satisfactory time interval commensurate with space was found to be in the neighborhood of one-tenth of a second.

This method of erasing required a lower value of erasing current which reduced heating of the heads. It permitted the use of laminations of standard thickness and the use of small heads so that they could be aligned transversely of the medium for selectively erasing multiple tracks on a single medium. Heads having front gaps approximately four mils in width were found to be particularly effective when a current of seventy milliamperes was applied to the windings.

The present invention is directed to a magnetic erasing head construction which utilizes the method described in this co-pending application, but which is of the general inductive type disclosed and claimed in my co-pending application, Ser. No. 150,875, filed March 21, 1950, and disclosed and claimed in Friend U. S. Patent No. 2,536,272 of January 2, 1951. The present head construction has many of the advantages pointed out in the Friend patent, and is particularly suitable for use in multiple track recording systems to conserve space.

The principal object of the invention, therefore, is to provide an improved magnetic erasing transducer construction of the inductive type.

Another object of the invention is to provide an improved inductive type magnetic erasing transducer which is economical and which is particularly effective in erasing magnetic records.

A further object of the invention is to provide an improved inductive type magnetic erasing transducer with multiple erasing fields.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 2:
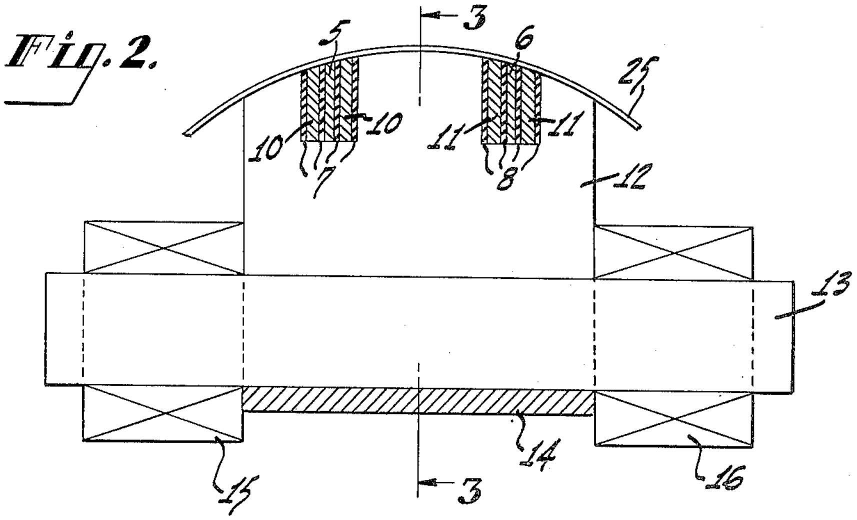
Fig. 2 is a cross-sectional view of the transducer shown in Fig. 1, and taken along the line 2—2 of Fig. 1.

Referring now to the drawings, in which the same numerals identify like elements, magnetic conductors 5 and 6 may be thin sheets of copper coated with a thin film of insulating material, such as polyvinyl formal, polyethylene, polystyrene, or other separate forms of insulating strips, such as shown at 7 and 8. The conductors may be .002 inch thick and .10 inch wide, while the insulating strips may be .001 inch thick and .10 inch wide. On each side of the conductors 5 and 6 separated by strips 7 and 8, are interposed a pair of strips 10 for conductor 5 and a pair of strips 11 for conductor 6. The strips 10 and 11 are of ferromagnetic material, such as permalloy or mu metal. These strips may be .003 inch thick and .10 inch wide. Insulating strips 7 and 8 are on both sides of each of conductors 5 and 6 and on both sides of each of the strips 10 and 11.

Figure 1:
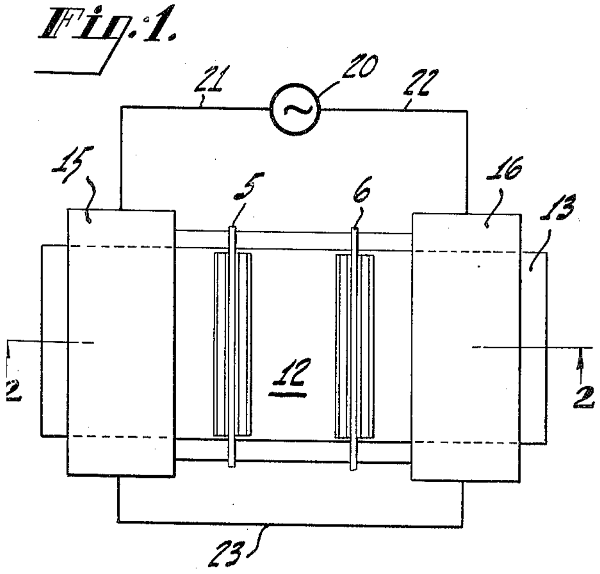
Fig. 1 is a plan view of a magnetic transducer embodying the invention.
Figure 3:
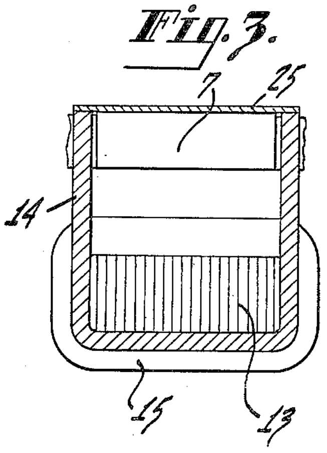
Fig. 3 is a cross-sectional view of the transducer taken along the line 3—3 of Fig. 2.
Figure 4:
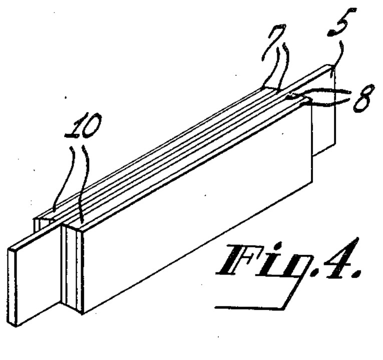
Fig. 4 is a perspective view showing the detailed construction of one of the conductor units.

A single pre-assembled unit of conductor 5, insulating strips 7, and mu metal strips 10, is shown in Fig. 4, these units then being inserted in slots in a body portion 12, as shown in Figs. 1 and 2. The ends of the conductors 5 and 6 are connected together and to a U-shaped conducting member 14, which is actually a single turn secondary winding of a transformer having primary windings 15 and 16 mounted on a core 13. An alternating current power source 20 having a frequency in the neighborhood of seventy kilocycles is connected to the primary windings 15 and 16 over conductors 21, 22, and 23. Thus, alternating current of the same frequency is passed through conductors 5 and 6.

With the construction just described, each portion of the sound track area in a magnetic record medium 25 moving over the edges of conductors 5 and 6 is subjected twice to the erase action of the current in the conductors. The two conductors are spaced approximately .1 inch apart and will subject the signal track to double erasing action as described in my above co-pending application, Ser. No. 182,316. The head is economical to construct and its dimensions are small, so that it is suitable for use in light portable magnetic recording and reproducing equipment.

I claim:

1. A magnetic transducer comprising a body portion having separated parallel notches therein, an assembly in each of said notches, said assembly consisting of a flat current carrying conductor, a layer of insulating material on each side of said conductor, and ferromagnetic material in contact with the other side of each of said layers of insulating material, a core, a primary winding of a transformer on said core, and a secondary winding for said transformer, said secondary winding connecting said conductors in parallel.

2. A magnetic record erasing head comprising a body portion, a pair of electrical conductors having their edges flush with the surface of said body portion and separated a predetermined distance, an insulating strip on each side of each of said conductors and having their edges flush with the surface of said body portion, a ferromagnetic strip on the other side of each of said insulating strips and having their edges flush with the surface of said body portion, means for connecting the ends of said conductors together, a magnetic core, a primary winding wound on said core section, and a secondary winding having one end connected to one pair of ends of said conductors and the other end connected to the other pair of ends of said conductors.

3. A magnetic erasing head for applying a plurality of erasing magnetic fields in serial order, comprising a plurality of spaced ribbon conductors having edges adapted to contact a record bearing magnetic medium, means for passing a record bearing magnetic medium over the edges of said conductors, a source of alternating current of erasing frequency, and means for passing said alternating current of erasing frequency through said conductors in parallel to provide a pair of simultaneously functioning and separated erasing fields through which said medium passes.

4. A magnetic erasing head for applying a plurality of erasing magnetic fields in serial order, comprising a plurality of spaced ribbon conductors having edges adapted to contact a record bearing magnetic medium, means for passing a record bearing magnetic medium over the edges of said conductors, and means for passing an alternating current of erasing frequency through said conductors, said last mentioned means including a transformer having a core, a primary winding on said core, and a single turn secondary winding on said core and connected to said conductors.

MICHAEL RETTINGER.

References Cited in the file of this patent

UNITED STATES PATENTS

| Number | Name | Date |
|---|---|---|
| 2,418,542 | Camras | Apr. 8, 1947 |